United States Patent Office
3,808,205
Patented Apr. 30, 1974

3,808,205
PROCESS FOR THE PREPARATION OF 4-HYDROXY - 3 - CARBAMYL-2H - 1,2 - BENZOTHIAZINE 1,1-DIOXIDES AND 4-HYDROXY-3(2H)-1,2-BENZOTHIAZINE CARBOXYLATE-1,1-DIOXIDES
Jagadish C. Sircar, Dover, Harold Zinnes, Rockaway, and John Shavel, Jr., Mendham, N.J., assignors to Warner-Lambert Company, Morris Plains, N.J.
No Drawing. Continuation-in-part of abandoned application Ser. No. 179,570, Sept. 10, 1971. This application May 8, 1972, Ser. No. 251,163
Int. Cl. C07d 93/02
U.S. Cl. 260—243 R      29 Claims

ABSTRACT OF THE DISCLOSURE

Novel processes for the preparation of 4-hydroxy-3-carbamoyl-2H-1,2-benzothiazine 1,1-dioxides (V) and 4-hydroxy-3(2H)-1,2-benzothiazinecarboxylate and -thiocarboxylate 1,1-dioxides (VII) are disclosed. These processes are represented by the following reaction schemes:

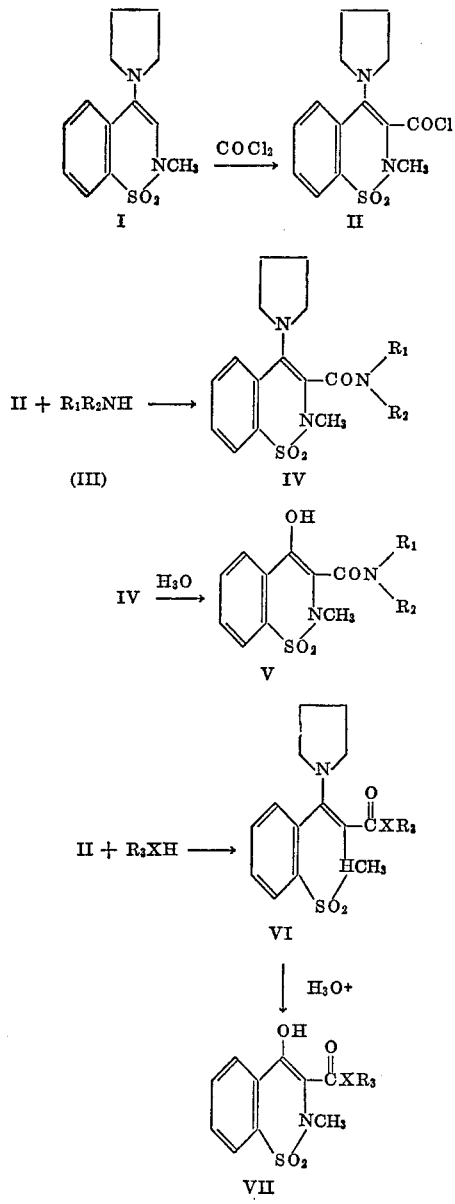

In the above, $R_1$ and $R_2$ are hydrogen, alkyl, aralkyl, aryl, adamantyl or, taken together, form a heterocyclic amine and $R_3$ is alkyl, aralkyl or aryl, and X is oxygen or sulfur. Compounds V are useful as anti-inflammatory agents. Compounds VII are useful as intermediates for the preparation of V by means of aminolysis reactions.

This application is a continuation-in-part of our copending application U.S. Ser. No. 179,570, filed Sept. 10, 1971 and now abandoned.

The present invention is concerned with novel processes and, more particularly, the present invention is concerned with novel processes for the preparation of 4-hydroxy-3-carbamoyl-2H-1,2-benzothiazine 1,1-dioxides (V) and 4-hydroxy-3(2H)-1,2-benzothiazinecarboxylate and -thiocarboxylate 1,1-dioxides (VII).

The present invention also includes within its scope novel intermediates useful in the preparation of the above compounds.

Compound V is useful as an anti-inflammatory agent and forms the basis of our copending application, Ser. No. 184,193, now U.S. Pat. No. 3,714,155, filed Sept. 27, 1971.

According to the present invention there are provided new processes for the production of the above compounds. Broadly speaking, the processes of this invention can be illustrated by the following reaction schemes:

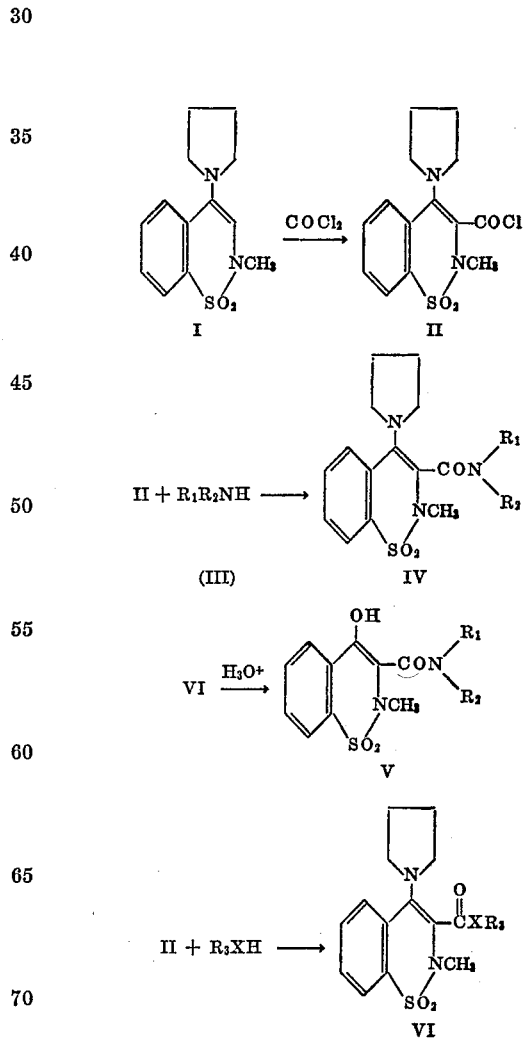

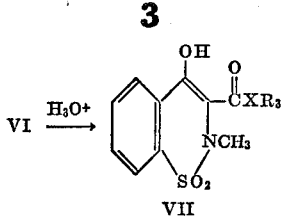

In the above formulas, $R_1$ and $R_2$ are hydrogen, alkyl, aralkyl, aryl, adamantyl or, taken together, form a heterocyclic amine, and $R_3$ is alkyl, aralkyl or aryl, and X is oxygen or sulfur.

Referring to the above reaction schemes, Compound I is treated with phosgene in the presence of a base such as triethylamine to form the acid chloride II. Acid chloride II is generally not isolated but is treated directly with the amine III to form a carbamoyl derivative IV. The amine is then hydrolyzed by refluxing with aqueous acid to give the desired Compound V.

The use of an alcohol or a phenol of the formula $R_3XH$ where X is oxygen, or a mercaptan or thiophenol of formula $R_3XH$ where X is sulfur, in place of Compound III gives rise to the corresponding enamine-esters or enamine-thioesters VI which can be hydrolyzed to the desired carboxylates or thiocarboxylates of structure VII.

The above described processes, in addition to providing a useful route to Compound V where either $R_1$ or $R_2$ is hydrogen, also make possible the facile synthesis of the compounds of Formula V wherein both $R_1$ and $R_2$ are substituted by groups other than hydrogen. Such compounds are not readily obtainable by previously known methods.

These new compounds are anti-inflammatory agents. When administered intraperitoneally to rats at a dose of 50-200 mg./kg. they are able to cause reduction in swelling of the paw induced by injection into the foot pads of an irritant such as carrageenin. The intermediate enamines of structure IV have a similar biological activity.

The processes also represent an alternate method for the preparation of esters of structure VII where $R_3$ is alkyl and X is oxygen. These compounds have been shown in our copending U.S. application 119,967, now abandoned, to be useful as intermediates in processes for the preparation of compounds of structure V which involve aminolysis reactions. Such reactions are described in the said copending application.

Furthermore, the presently disclosed process also provides a route to phenolic esters of structure VII where X is oxygen and $R_3$ is aryl and thioesters and thiophenolic esters of structure VII where X is sulfur and $R_3$ is alkyl or aryl. These are new type compounds which are not accessible by previously described methods. Such phenolic esters, thioesters, and thiophenolic esters are particularly useful intermediates in aminolysis reactions because the aryloxy, thioalkoxy and thioaryloxy moieties are especially efficient leaving groups.

The aminolysis process is illustrated as follows:

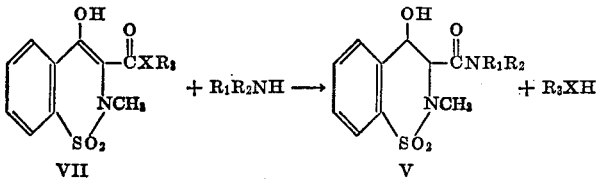

In the above definitions for $R_1$, $R_2$ and $R_3$, alkyl is meant to contain from 1-7 carbon atoms such as methyl, ethyl, propyl, and the like. Aryl is meant to be an aromatic ring system typified by phenyl or naphthyl, and aralkyl is meant to be an alkyl group as defined above substituted by an aryl group as defined above. Heterocyclic amine is meant to include a heterocyclic amine such as pyrrolidine, aziridine, piperidine, morpholine and the like.

Starting material I is described in Zinnes et al., J.O.C., 31, 162 (1966).

To further illustrate the practice of this invention, the following examples are included.

EXAMPLE 1

Preparation of 2-methyl-3-carbamoyl-4-(1-pyrrolidinyl)-2H-1,2-benzothiazine 1,1-dioxides General procedure.—A solution of 6.0 g. (0.06 mole) of phosgene in 55 ml. of benzene was diluted with 30 ml. of tetrahydrofuran (freshly distilled from lithium aluminum hydride) and cooled to —10°. To this was added, over a period of 30 minutes, a solution of 13.2 g. (0.05 mole) of 2-methyl-4-(1-pyrrolidinyl)-2H-1,2-benzothiazine 1,1-dioxide and 8.2 ml. of triethylamine in 200 ml. of tetrahydrofuran and the reaction mixture was stirred at room temperature for 3 hours. A solution of 0.068 mole of the appropriate primary or secondary amine and 8.2 ml. of triethylamine in 50 ml. of tetrahydrofuran was added at room temperature over a period of 10 minutes and stirring was continued for an additional hour. The reaction mixture was refluxed for 16 hours, concentrated to half of its volume, treated with ice-water, and extracted with dichloromethane. Evaporation of the solvent gave a residue which was triturated with 1000 ml. of ether and an insoluble polymeric material was filtered off. The filtrate was concentrated to a small volume to cause precipitation of the crude enamine-amide. This was purified as described for the individual examples. In same cases the crude enamine-amide was hydrolyzed directly to the corresponding 4-hydroxy-3-carbamyl-2H-1,2-benzothiazine 1,1-dioxide without further purification.

EXAMPLE 2

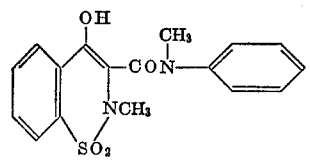

4 - hydroxy - 2,N-dimethyl-2H-1,2-benzothiazine-3-carboxanilide 1,1-dioxide.—The enamine-amide was prepared as described above, using 6.0 g. of N-methylaniline. It was obtained as a crude oil which was hydrolyzed by refluxing with 200 ml. of 3 N hydrochloric acid for one hour. The reaction mixture was extracted with dichloromethane and the organic phase re-extracted with 4% aqueous sodium hydroxide. Acidification gave a white solid which was collected and recrystallized from methanol to give 2.7 g. of product, M.P. 175–177° dec., which was shown to be identical with the product obtained by methylation of 4-hydroxy-2-methyl-3-phenylcarbamyl-2H-1,2-benzothiazine 1,1-dioxide.

EXAMPLE 3

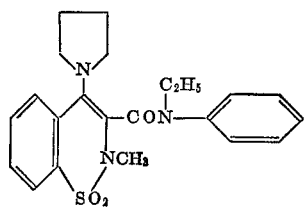

N-ethyl - 2 - methyl - 4(1-pyrrolidinyl)-2H-1,2-benzothiazine-3-carboxanilide 1,1-dioxide.—The enamine-amide obtained from 6.5 g. of N-ethylaniline was redissolved in 800 ml. of ether, filtered to remove more polymeric material and the filtrate was concentrated to a volume of 400 ml. to give 9.7 g. of crystalline product, M.P. 142–144°.

Analysis.—Calcd. for $C_{22}H_{25}N_3O_3S$ (percent): C, 64.21; H, 6.12; N, 10.21; S, 7.79. Found (percent): C, 64.31; H, 6.15; N, 10.24; S, 7.83.

EXAMPLE 4

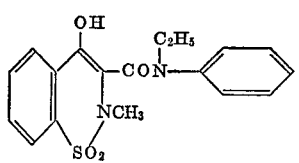

N-ethyl - 4 - hydroxy-2-methyl-2H-1,2-benzothiazine-3-carboxanilide 1,1-dioxide.—The crude N-ethyl-2-methyl-4-(pyrrolidinyl)-2H-1,2-benzothiazine-3-carboxanilide 1,1-dioxide, prepared from 6.5 g. of N-ethylaniline was hydrolyzed as in the previous example. The crude product which precipitated on acidification was recrystallized from methanol to give 8.3 g. of material, M.P. 150–152° dec.

*Analysis.*—Calcd. for $C_{18}H_{18}N_2O_4S$ (percent): C, 60.32; H, 5.06; N, 7.82; S, 8.95. Found (percent): C, 60.47; H, 5.10; N, 7.79; S, 9.19.

EXAMPLE 5

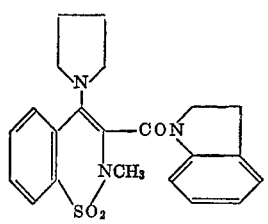

3 - (1 - indolinylcarbonyl)-2-methyl-4-(1-pyrrolidinyl)-2H-1,2-benzothiazine 1,1-dioxide.—The crude product obtained from 7.2 g. of indoline was recrystallized from tetrahydrofuran-ether (with charcoal treatment) to give 4.0 g. of material, M.P. 177–179° dec.

*Analysis.*—Calcd. for $C_{22}H_{23}N_3O_3S$ (percent): C, 64.53; H, 5.66; N, 10.26; S, 7.83. Found (percent): C, 64.52; H, 5.81; N, 9.96; S, 7.98.

EXAMPLE 6

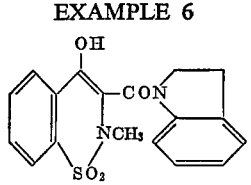

3 - (1 - indolinylcarbonyl) - 2 - methyl - 2H - 1,2-benzothiazin - 4 - ol 1,1 - dioxide.—Hydrolysis of 4.3 g. of 3 - (1 - indolinylcarbonyl)-2-methyl-4-(1-pyrrolidinyl)-2H-1,2-benzothiazine 1,1-dioxide was carried out in an analogous manner to that described above. Recrystallization of the crude product from methanol gave 3.0 g. of material, M.P. 200–202° dec.

*Analysis.*—Calcd. for $C_{18}H_{16}N_2O_4S$ (percent): C, 60.66; H, 4.53; N, 7.86; S, 9.00. Found (percent): C, 60.61; H, 4.60; N, 7.74; S, 9.04.

EXAMPLE 7

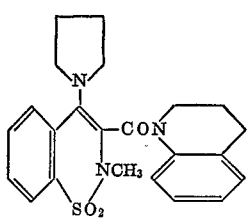

2 - methyl - 4 - (1 - pyrrolidinyl)-3-(1,2,3,4-tetrahydro-1 - quinolylcarbonyl) - 2H - 1,2 - benzothiazine 1,1-dioxide.—The reaction was carried out as described above, using 7.3 g. of tetrahydroquinoline. The crude product was recrystallized (with charcoal treatment) from tetrahydrofuran-ether to give 9.4 g. of material, M.P. 182–185° dec.

*Analysis.*—Calcd. for $C_{23}H_{25}N_3O_3S$ (percent): C, 65.23; H, 5.95; N, 9.92; S, 7.57. Found (percent): C, 65.53; H, 6.10; N, 9.67; S, 7.66.

EXAMPLE 8

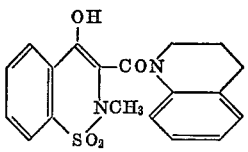

2 - methyl - 3 - (1,2,3,4 - tetrahydro - 1 - quinolylcarbonyl) - 2H - 1,2 - benzothiazine-4-ol 1,1-dioxide.—Hydrolysis of 10.0 g. of 2-methyl-4-(1-pyrrolidinyl)-3-(1,2,3,4 - tetrahydro - 1 - quinolylcarbonyl) - 2H-1,2-benzothiazine 1,1-dioxide was carried out in an analogous manner to that described above. Recrystallization of the crude product from methanol-dichloromethane gave 7.5 g. of material, M.P. 173–174° dec.

*Analysis.*—Calcd. for $C_{19}H_{18}N_2O_4S$ (percent): C, 61.61; H, 4.90; N, 7.56; S, 8.66. Found (percent): C, 61.51; H, 5.01; N, 7.31; S, 8.71.

EXAMPLE 9

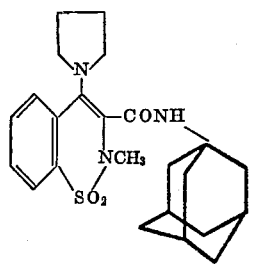

N - (1 - adamantyl) - 2 - methyl - 4 - (1-pyrrolidinyl)-2H - 1,2 - benzothiazine - 3 - carboxamide 1,1-dioxide.—The crude product obtained from 7.6 g. of 1-adamantanamine was recrystallized from ether-dichloromethane to give 11.5 g. of crystalline material, M.P. 160–162° dec., whose infrared spectrum (shoulder at 1690 cm.$^{-1}$) showed the presence of some polymeric material. Repeated recrystallization from tetrahydrofuran-ether gave 3.5 g. of pure product, M.P. 160–162° dec.

*Analysis.*—Calcd. for $C_{24}H_{31}N_3O_3S$ (percent): C, 65.28; H, 7.08; N, 9.52; S, 7.26. Found (percent): C, 65.46; H, 7.13; N, 9.54; S, 7.44.

EXAMPLE 10

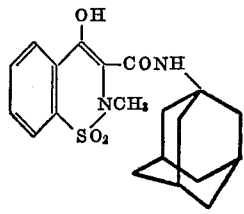

N - (1 - adamantyl) - 4 - hydroxy - 2 - methyl - 2H-1,2-benzothiazine - 3 - carboxamide 1,1-dioxide.—Hydrolysis of 11.5 g. of once recrystallized N - (1 -adamantyl)-2 - methyl - 4 - (1 - pyrrolidinyl) - 2H - 1,2-benzothiazine - 3 - carboxamide 1,1-dioxide was carried out in an analogous manner to that described in previous examples. Recrystallization of the crude product from tetrahydrofuran-methanol to give 6.4 g. of material, M.P. 251–253° dec.

*Analysis.*—Calcd. for $C_{20}H_{24}N_2O_4S$ (percent): C, 61.84; H, 6.23; N, 7.21; S, 8.25. Found (percent): C, 61.90; H, 6.18; N, 7.24; S, 8.28.

EXAMPLE 11

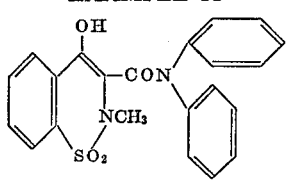

4-hydroxy-2-methyl - N,N - diphenyl-2H-1,2-benzothiazine-3-carboxamide 1,1-dioxide.—The crude enamine-amide obtained from 10.2 g. of diphenylamine was refluxed for 45 minutes with a mixture of 1600 ml. of methanol, 100 ml. of water, and 15 ml. of concentrated hydrochloric acid. On cooling, there was obtained 7.8 g. of crystalline precipitate, M.P. 182–187° dec. Recrystallization from methanol-dichloromethane gave 4.4 g. of material, M.P. 186–189° dec.

Analysis.—Calcd. for $C_{22}H_{18}N_2O_4S$ (percent): C, 65.01; H, 4.46; N, 6.89; S, 7.89. Found (percent): C, 65.00; H, 4.48; N, 6.79; S, 7.94.

EXAMPLE 12

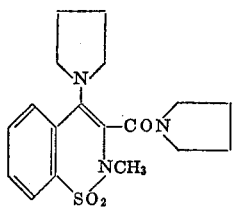

2-methyl-4-(1-pyrrolidinyl) - 3 - (1-pyrrolidinylcarbonyl)-2H-1,2-benzothiazine 1,1-dioxide.—The reaction and work-up was carried out as in the previous examples, using 8.5 g. of pyrrolidine, with a reflux time of only 1.5 hr. Trituration of the dichloromethane extract with ether gave 16.1 g. of crystalline product, M.P. 224–226° dec. Recrystallization from tetrahydrofuran-dichloromethane gave 12.8 g. of material, M.P. 224–226° dec.

Analysis.—Calcd. for $C_{18}H_{23}N_3O_3S$ (percent): C, 59.81; H, 6.41; N, 11.62; S, 8.87. Found (percent): C, 59.70; H, 6.33; N, 11.51; S, 8.67.

EXAMPLE 13

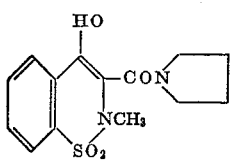

4-hydroxy - 2 - methyl-3-(1-pyrrolydinylcarbonyl)-2H-1,2-benzothiazine 1,1-dioxide.—Hydrolysis of 500 mg. of 2-methyl-4-(1-pyrrolidinyl)-3-(1 - pyrrolidinylcarbonyl)-2H-1,2-benzothiazine 1,1-dioxide was carried out as in previous examples. A solution of the crude product in a mixture of 5 ml. of tetrahydrofuran and 15 ml. of dichloromethane was filtered, concentrated to a volume of 5 ml., and treated with a few drops of ether to give 260 mg. of crystalline material, M.P. 220–222°.

Analysis.—Calcd. for $C_{14}H_{16}N_2O_4S$ (percent): C, 54.53; H, 5.23; N, 9.08; S, 10.40. Found (percent): C, 54.79; H, 5.35; N, 9.34; S, 10.49.

EXAMPLE 14

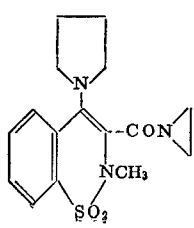

3-(1-aziridinylcarbonyl)-2-methyl-4-(1 - pyrrolidinyl)-2H-1,2-benzothiazine 1,1-dioxide.—The enamine - acid chloride was prepared as described above. The reaction mixture was cooled to −40°, and a solution of 2.5 g. of ethyleneimine and 8.2 ml. of triethylamine in 100 ml. of tetrahydrofuran was added over a period of 20 minutes. It was stirred for 20 hrs., during which time it gradually warmed to room temperature. Treatment with ice-water, extraction with dichloromethane, and evaporation of the latter solvent gave an oily residue which solidified on trituration with ether. The crude solid was stirred with a mixture of 800 ml. of ether and 20 ml. of dichloromethane. The mixture was filtered to remove some insoluble polymer and the filtrate concentrated to a volume of 500 ml. to give 7.9 g. of crystalline product, M.P. 135–136°.

Analysis.—Calcd. for $C_{16}H_{19}N_3O_3S$ (percent): C, 57.64; H, 5.74; N, 12.60; S, 9.62. Found (percent): C, 57.40; H, 5.71; N, 12.38; S, 9.63.

EXAMPLE 15

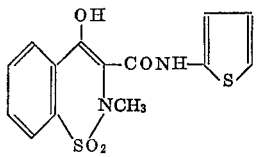

4-hydroxy - 2 - methyl-N-(2-thienyl)-2H-1,2-benzothiazine-3-carboxamide 1,1-dioxide.—The enamine-acid chloride was prepared as described above. To the crude acid chloride was added 14 g. of 2-aminothiophene tin complex,

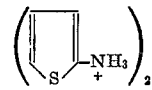

(Steinkopf, Ann., 403, 27 (1913)). The mixture was heated to reflux, a solution of 20 ml. of triethylamine in 100 ml. of tetrahydrofuran was added to the solution, and refluxing was continued for one hour. The usual work-up gave an oil which solidified on trituration with ether. It was refluxed for 30 minutes with a mixture of 250 ml. of methanol and 20 ml. of concentrated hydrochloric acid. Dilution with water, extraction with dichloromethane, re-extraction with 4% sodium hydroxide, acidification, re-extraction with dichloromethane, and evaporation of the solvent gave an oily residue. This was triturated with 100 ml. of ether. An insoluble polymeric material was filtered off and the filtrate was concentrated to about 50 ml. to give 600 mg. of crystalline product, M.P. 243–248° dec. Recrystallization from methanol-dichloromethane gave 465 mg. of material, M.P. 252–254°.

Analysis.—Calcd. for $C_{14}H_{12}N_2O_4S_2$ (percent): C, 49.99; H, 3.59; N, 8.33; S, 19.06. Found (percent): C, 49.80; H, 3.61; N, 7.91; S, 18.98.

EXAMPLE 16

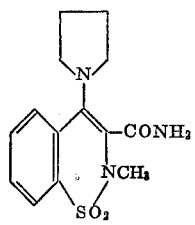

2 - methyl - 4 - (1 - pyrrolidinyl) - 2H - 1,2 - benzothiazine-3-carboxamide 1,1-dioxide.—The acid chloride was prepared as described above. The reaction mixture was cooled to −40° and 5.8 g. of formamidine acetate was added all at once, the system was flushed with nitrogen, and a solution of 16.4 ml. of triethylamine in 50 ml. of tetrahydrofuran was slowly added. The mixture was stirred at room temperature for 20 hr., refluxed 2 hr. and worked up in the usual manner. Trituration of the dichloromethane extract with ether gave 6.8 g. of a crude solid. Recrystallization from tetrahydrofuran gave 4.8 g. of crystalline product, M.P. 176–177°.

Analysis.—Calcd. for $C_{14}H_{17}N_3O_3S$ (percent): C, 54.71; H, 5.57; N, 13.67; S, 10.43. Found (percent): C, 54.57; H, 5.69; N, 13.94; S, 10.57.

EXAMPLE 17

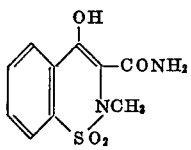

4 - hydroxy - 2 - methyl - (1 - pyrrolidinyl)-2H-1,2-benzothiazine - 3 - carboxamide 1,1-dioxide.—A mixture of 1 g. of 2-methyl - 4 - (1 - pyrrolidinyl)-2H-1,2-benzothiazine - 3 - carboxamide 1,1-dioxide, and 20 ml. of 1 N hydrochloric acid was heated on a steam bath for 30 minutes. On cooling, there was obtained 800 mg. of crystalline material, M.P. 243–246° dec., which was shown by mixture M.P. and comparison of infrared spectra to be identical with an authentic sample.

EXAMPLE 18

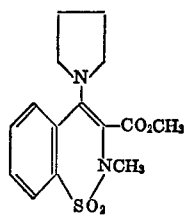

Methyl 2 - methyl - 4 - (1 - pyrrolidinyl) - 2H - 1,2-benzothiazine-3-carboxylate 1,1 - dioxide.—The enamine-acid chloride was prepared as described above. A mixture of 12.8 g. of methanol and 6.0 g. of triethylamine was added at a temperature of —20 to —30°. The temperature was allowed to slowly rise, the mixture was stirred at room temperature for 2 hr., refluxed for 30 minutes, and concentated to about half of its volume. It was diluted with ice-water and extracted with dichloromethane. Evaporation of the solvent gave a residue which was triturated with ether to give 11.0 g. of crystalline solid, M.P. 122–124° dec. Recrystallization from tetrahydrofuran gave an analytical sample, M.P. 123–124° dec.

Analysis.—Calcd. for $C_{15}H_{18}N_2O_4S$ (percent): C, 55.89; H, 5.63; N, 8.69; S, 9.95. Found (percent): C, 56.07; H, 5.70; N, 8.68; S, 10.04.

EXAMPLE 19

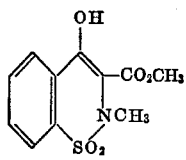

Methyl 2-methyl - 4 - hydroxy - 2H - 1,2-benzothiazine-3-carboxylate 1,1-dioxide.—A mixture of 1.1 g. of methyl 2-methyl - 4 - (1 - pyrrolidinyl)-2H-1,2-benzothiazine-3-carboxylate 1,1-dioxide, 20 ml. of 3 N hydrochloric acid, and 10 ml. of methanol was refluxed for 30 minutes, cooled, and diluted with ice-water. The resulting precipitate was recrystallized from isopropyl alcohol and then from tetrahydrofuran-ether to give 700 mg. of product, M.P. 165–168° dec.

Analysis.—Calcd. for $C_{11}H_{11}NO_5S$ (percent); C, 49.06; H, 4.12; N, 5.20; S, 11.91. Found (percent): C, 49.05; H, 4.08; N, 4.98; S, 11.88.

EXAMPLE 20

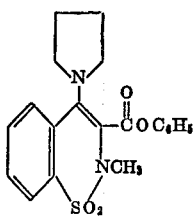

Phenyl 2 - methyl - 4 - (1-pyrrolidinyl)-2H-1,2-benzothiazine - 3 - carboxylate 1,1-dioxide.—The enamine-acid chloride was prepared as described above. It was cooled to —40° and a mixture of 5.25 g. (0.055 mole) of phenol, 10 ml. of triethylamine, and 50 ml. of tetrahydrofuran was added. The temperature was allowed to slowly rise and the mixture was stirred at room temperature for 20 hr., refluxed for 3 hr., and concentrated to about half its volume. It was diluted with ice-water and extracted with dichloromethane. Evaporation of the solvent gave a solid residue which was triturated with 300 ml. of ether to give 16.5 g. of crystalline product, M.P. 163–165°. Recrystallization from a mixture of 150 ml. of tetrahydrofuran, and 150 ml. of dichloromethane gave 13 g. of material, M.P. 161–163°.

Analysis.—Calcd. for $C_{20}H_{20}N_2O_4S$ (percent): C, 62.48; H, 5.24; N, 7.29; S, 8.34. Found (percent): C, 62.16; H, 5.27; N, 7.19; S, 8.45.

EXAMPLE 21

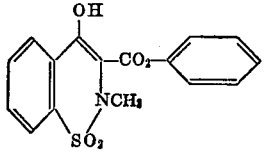

Phenyl 4-hydroxy - 2 - methyl-2H-1,2-benzothiazine-3-carboxylate 1,1-dioxide.—The enamine-acid chloride was prepared as described above. It was refluxed for 4 hours with a solution of 5.7 g. of phenol and 10 ml. of triethylamine in 20 ml. of tetrahydrofuran. The reaction mixture was worked up by pouring into ice-water and extracting with dichloromethane. Evaporation of the dichloromethane gave the crude enamine-ester as a syrup. This was dissolved in 720 ml. of hot methanol, diluted with 20 ml. of water, and 4.0 ml. of concentrated hydrochloric acid was added. It was refluxed until dilution of an aliquot with aqueous sodium hydroxide failed to give an appreciable amount of precipitate (about 20 minutes) and was immediately poured into ice-water. The resulting precipitate was collected and recrystallized from methanol to give 9.0 g. of product, M.P. 134–137°.

Analysis.—Calcd. for $C_{16}H_{13}NO_5S$ (percent): C, 58.00; H, 3.95; N, 4.23; S, 9.68. Found (percent): C, 57.91; H, 3.86; N, 4.49; S, 9.48.

EXAMPLE 22

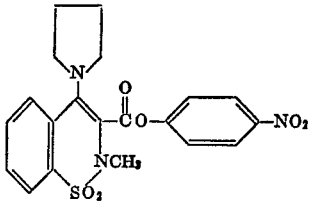

p-Nitrophenyl 2 - methyl - 4 - (1 - pyrrolidinyl)-2H-1,2-benzothiazine-3-carboxylate 1,1-dioxide.—The enamine acid chloride was prepared as described above. It was cooled to —40° and a mixture of 7.7 g. (0.055 mole) of p-nitrophenol, 10 ml. of triethylamine, and 50 ml. of tetrahydrofuran was added. The temperature was allowed to slowly rise and the mixture was stirred at room temperature for 16 hrs., refluxed for 3 hrs., and concentrated to about half of its volume. It was diluted with ice-water and extracted with dichloromethane. Evaporation of the solvent gave a solid residue which was recrystallized from dichloromethane-tetrahydrofuran to give 13.9 g. of product, M.P. 215–217° dec. Recrystallization from the same solvent gave 12.5 g. of material, M.P. 216–217° dec.

Analysis.—Calcd. for $C_{20}H_{19}N_3O_6S$ (percent): C, 55.94; H, 4.46; N, 9.78; S, 7.47. Found (percent): C, 55.72; H, 4.69; N, 9.86; S, 7.52.

EXAMPLE 23

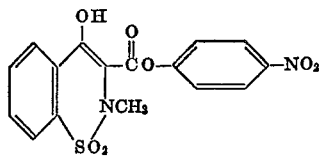

p-Nitrophenyl 4 - hydroxy - 2 - methyl-2H-1,2-benzothiazine-3-carboxylate 1,1-dioxide.—A mixture of 3.0 g. of p-nitrophenyl 2-methyl-4-(1-pyrrolidinyl)-2H-1,2-benzothiazine-3-carboxylate 1,1-dioxide, 150 ml. of acetic acid, and 45 ml. of 1 N hydrochloric acid was heated on a steam bath for 45 minutes and diluted with 200 ml. of ice-water. The resulting precipitate was collected and recrystallized from dichloromethane-ether to give 1.8 g. of product, M.P. 188–191°.

Analysis.—Calcd. for $C_{16}H_{12}N_2O_7S$ (percent): C, 51.06; H, 3.21; N, 7.44; S, 8.52. Found (percent): C, 50.92; H, 3.32; N, 7.42; S, 8.70.

EXAMPLE 24

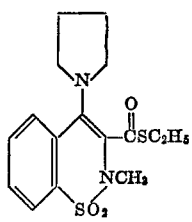

Ethyl 2-methyl - 4 - (1 - pyrrolidinyl)-2H-1,2-benzothiazine-3-thiocarboxylate 1,1-dioxide.—The enamine-acid chloride was prepared as described above. A mixture of 3.5 g. (0.055 mole) of ethanethiol, 8.2 ml. of triethylamine and 25 ml. of tetrahydrofuran was added at a temperature of −50°. The temperature was allowed to slowly rise and the mixture was stirred at room temperature for 16 hr., refluxed for 3 hr., and concentrated to about half of its volume. It was diluted with ice-water and extracted with dichloromethane. Evaporation of the solvent gave an oily residue which was triturated with 400 ml. of ether. The solid which separated on standing was filtered off and discarded. The filtrate was concentrated to a volume of 50 ml. On standing there separated 5.9 g. of crystalline product, M.P. 140–145° dec. Recrystallization from 150 ml. of ether gave 4.0 g. of an analytical sample, M.P. 146–148° dec.

Analysis.—Calcd. for $C_{16}H_{18}NO_4S_2$ (percent): C, 54.52; H, 5.72; N, 7.95; S, 18.19. Found (percent): C, 54.56; H, 5.67; N, 7.89; S, 17.91.

EXAMPLE 25

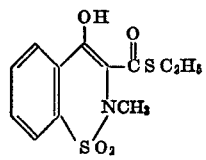

Ethyl 2-methyl-4-hydroxy-2H-1,2-benzothiazine-3-thiocarboxylate 1,1-dioxide.—The reaction was carried out as in the previous example. The crude dichloromethane extract was treated with 50 ml. of acetic acid and 25 ml. of 1 N hydrochloric acid and the mixture was heated on a steam bath for one hour. It was poured into ice-water, extracted with dichloromethane and the organic layer was then extracted with 1 N sodium hydroxide. The alkaline solution was carefully acidified (with cooling) and reextracted with dichloromethane. Evaporation of the solvent gave an oily residue which was triturated with 40 ml. of ether. On standing, there was obtained 5.3 g. of crystalline product, M.P. 139–141°. Recrystallization from ether gave an analytical sample, M.P. 139–142°.

Analysis.—Calcd. for $C_{12}H_{13}NO_4S_2$ (percent): C, 48.15; H, 4.38; N, 4.68; S, 21.42. Found (percent): C, 48.44; H, 4.41; N. 4.63; S, 21.44.

EXAMPLE 26

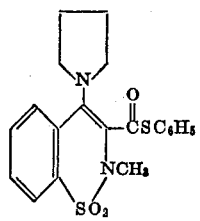

Phenyl 2 - methyl-4-(1-pyrrolidinyl)-2H-1,2-benzothiazine - 3-thiocarboxylate 1,1-dioxide.—The enamine-acid chloride was prepared as described above. A mixture of 6.0 g. of thiophenol, 8.2 ml. of triethylamine, and 50 ml. of tetrahydrofuran was added at a temperature of −50°. The temperature was allowed to slowly rise and the mixture was stirred at room temperature for 16 hr., refluxed for 3 hr., and concentrated to about half of its volume. It was diluted with ice-water, extracted with dichloromethane, and the solvent was evaporated. The oily residue was triturated with ether and the insolubles which separated out were collected and discarded. The filtrate was allowed to stand at room temperature, whereupon there was precipitated 15.0 g. of yellow needles, M.P. 164–166°. This was stirred with a mixture of 100 ml. of tetrahydrofuran and 100 ml. ether and a small amount of insoluble polymeric material was removed by filtration. Concentration of the filtrate gave 11.2 g. of product, M.P., 165–167°.

Analysis.—Calcd. for $C_{20}H_{20}N_2O_3S_2$ (percent): C, 60.00; H, 5.03; N, 6.99; S, 16.01. Found (percent): C, 60.23; H, 5.06; N, 6.91; S, 16.05.

EXAMPLE 27

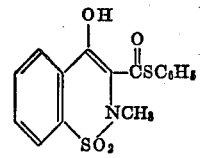

Phenyl 4 - hydroxy - 2 - methyl-2H-1,2-benzothiazine-3-thiocarboxylate 1,1 - dioxide.—A mixture of 8.0 g. of phenyl 2-methyl-4-(1-pyrrolidinyl)-pH-1,2-benzothiazine-3-thiocarboxylate 1,1-dioxide, 220 ml. of acetic acid and 150 ml. of 1 N hydrochloric acid was heated on a steam bath for one hour and poured into ice-water. The resulting precipitate was collected, dissolved in 100 ml. of 1 N sodium hydroxide. The filtered alkaline solution was carefully acidified and the resulting precipitate was collected and dissolved in dichloromethane. The dried (Na$_2$SO$_4$) solution was evaporated and the residue was recrystallized from a mixture of 400 ml. of ether and 15 ml. of dichloromethane to give 6.5 g. of product, M.P. 170–171°.

Analysis.—Calcd. for $C_{16}H_{13}NO_4S_2$ (percent): C, 55.32; H, 3.77; N, 4.03; S, 18.46. Found (percent): C, 55.43; H, 3.70; N, 4.08; S, 18.53.

What is claimed is:
1. A process for the production of a compound of the formula:

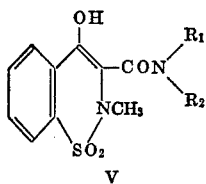

wherein $R_1$ and $R_2$ are hydrogen, alkyl, phenylalkyl, in which alkyl has 1 to 7 carbon atoms, phenyl, naphthyl or p-nitrophenyl, adamantyl or, taken together, form a heterocycle selected from the group consisting of indolinyl, pyrrolidinyl, morpholinyl, piperidinyl, quinolinyl, aziridinyl and thienyl, which comprises treating a compound of the formula:

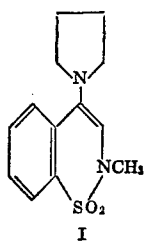

with phosgene in the presence of a base to form the acid chloride II:

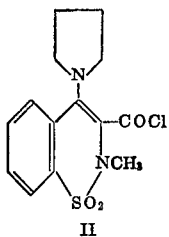

treating said Compound II with an amine of the formula $R_1R_2NH$ to form a carbamoyl derivative of Formula IV:

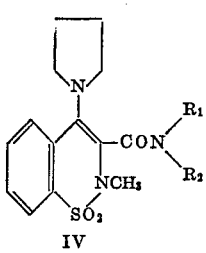

and refluxing said Compound IV with an aqueous acid.

2. A process for the production of a compound of the formula:

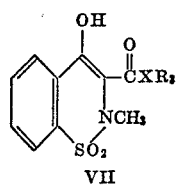

wherein X is oxygen or sulfur, and $R_3$ is alkyl, phenylalkyl in which alkyl has 1 to 7 carbon atoms, phenyl, naphthyl or p-nitrophenyl, which comprises treating a compound of the formula:

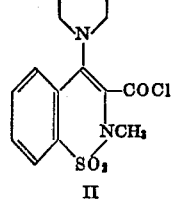

with an alcohol, phenol, mercaptan or thiophenol of formula $R_3XH$ to form an enamine-ester or enamine-thioester of the formula:

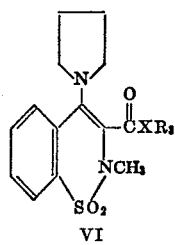

and heating said Compound VI with aqueous acid.

3. A compound of structure IV:

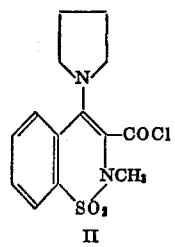

wherein $R_1$ and $R_2$ are hydrogen, alkyl, phenylalkyl in which alkyl has 1 to 7 carbon atoms, phenyl, naphthyl or p-nitrophenyl, adamantyl or, taken together, form a heterocycle selected from the group consisting of indolinyl, pyrrolidinyl, morpholinyl, piperidinyl, quinolinyl, aziridinyl and thienyl.

4. A compound of claim 3 which is N-ethyl-2-methyl-4-(1-pyrrolidinyl)-2H-1,2-benzothiazine-3-carboxanilide 1,1-dioxide.

5. A compound of claim 3 which is 3-(1-indolinylcarbonyl)-2-methyl-4-(1-pyrrolidinyl)-2H-1,2-benzothiazine 1,1-dioxide.

6. A compound of claim 3 which is 2-methyl-4-(1-pyrrolidinyl)-3-(1,2,3,4-tetrahydro-1-quinolylcarbonyl)-2H-1,2-benzothiazine 1,1-dioxide.

7. A compound of claim 3 which is N-(1-adamantyl)-2-methyl-4-(1-pyrrolidinyl)-2H-1,2-benzothiazine-3-carboxamide 1,1-dioxide.

8. A compound of claim 3 which is 2-methyl-4-(1-pyrrolidinyl)-3-(1-pyrrolidinylcarbonyl)-2H-1,2-benzothiazine 1,1-dioxide.

9. A compound of claim 3 which is 3-(1-aziridinylcarbonyl)-2-methyl-4-(1-pyrrolidinyl)-2H-1,2-benzothiazine 1,1-dioxide.

10. A compound of claim 3 which is 2-methyl-4-(1-pyrrolidinyl)-2H-1,2-benzothiazine-3-carboxamide 1,1-dioxide.

11. N-ethyl-4-hydroxy-2-methyl-2H-1,2-benzothiazine-3-carbonxanilide 1,1-dioxide.

12. 3-(1-indolinylcarbonyl)-2-methyl-2H-1,2-benzothiazin-4-ol 1,1-dioxide.

13. 2-methyl-3-(1,2,3,4-tetrahydro-1-quinolylcarbonyl)-2H-1,2-benzothiazin-4-ol 1,1-dioxide.

14. N-(1-adamantyl)-4-hydroxy-2-methyl-2H-1,2-benzothiazine-3-carboxamide 1,1-dioxide.

15. 4-hydroxy-2-methyl-N,N-diphenyl-2H-1,2-benzothiazine-3-carboxamide 1,1-dioxide.

16. 4-hydroxy-2-methyl-3-(1-pyrrolidinylcarbonyl)-2H-1,2-benzothiazine 1,1-dioxide.

17. 4-hydroxy-2-methyl-N-(2-thienyl)-2H-1,2-benzothiazine-3-carboxamide 1,1-dioxide.

18. A compound of structure VI:

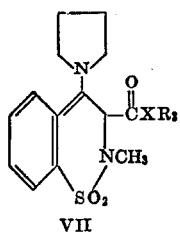

VII wherein $R_3$ is alkyl, phenylalkyl in which alkyl has 1 to 7 carbon atoms, phenyl, naphthyl or p-nitrophenyl, and X is oxygen or sulfur.

19. A compound of claim 18 which is methyl 2-methyl-4-(1-pyrrolidinyl)-2H-1,2-benzothiazine-3-carboxylate 1,1-dioxide.

20. A compound of claim 18 which is phenyl 2-methyl-4-(1-pyrrolidinyl)-2H-1,2-benzothiazine-3-carboxylate 1,1-dioxide.

21. A compound of claim 18 which is p-nitrophenyl 2-methyl-4-(1-pyrrolidinyl)-2H-1,2-benzothiazine-3-carboxylate 1,1-dioxide.

22. A compound of claim 18 which is ethyl 2-methyl-4-(1-pyrrolidinyl)-2H-1,2-benzothiazine-3-thiocarboxylate 1,1-dioxide.

23. A compound of claim 18 which is phenyl 2-methyl-4-(1-pyrrolidinyl)-2H-1,2-benzothiazine-3-thiocarboxylate 1,1-dioxide.

24. A compound of structuure VII:

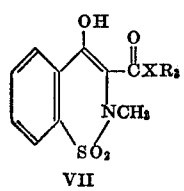

VII wherein X is oxygen and $R_3$ is phenyl, naphthyl and p-nitrophenyl.

25. A compound of claim 24 which is phenyl 4-hydroxy-2-methyl-2H-1,2-benzothiazine-3-carboxylate 1,1-dioxide.

26. A compound of claim 24 which is p-nitrophenyl 4-hydroxy-2-methyl-2H-1,2-benzothiazine-3-carboxylate 1,1-dioxide.

27. A compound of the structure:

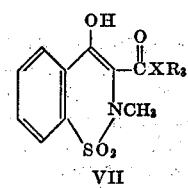

VII wherein X is sulfur and $R_3$ is phenyl, naphthyl and p-nitrophenyl, or alkyl of 1 to 7 carbon atoms.

28. A compound of claim 27 is ethyl 2-methyl-4-hydroxy-2H-1,2-benzothiazine-3-thiocarboxylate 1,1-dioxide.

29. A compound of claim 27 which is phenyl 4-hydroxy-2-methyl-2H-1,2-benzothiazine-3-thiocarboxylate 1,1-dioxide.

References Cited
UNITED STATES PATENTS
3,646,020  2/1972  Zinnes et al. _____ 260—243

JOHN M. FORD, Primary Examiner

U.S. Cl. X.R.
424—246

UNITED STATES PATENT OFFICE
CERTIFICATE OF CORRECTION

Patent No. 3,808,205     Dated April 30, 1974

Inventor(s) JAGADISH C. SIRCAR, ET AL.

It is certified that error appears in the above-identified patent and that said Letters Patent are hereby corrected as shown below:

Column 1, Reaction scheme structures V and VI, between lines 44 and 62 as follows:

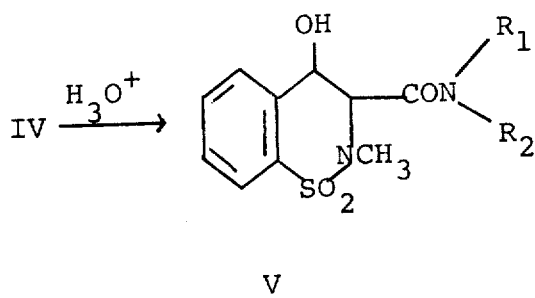

V

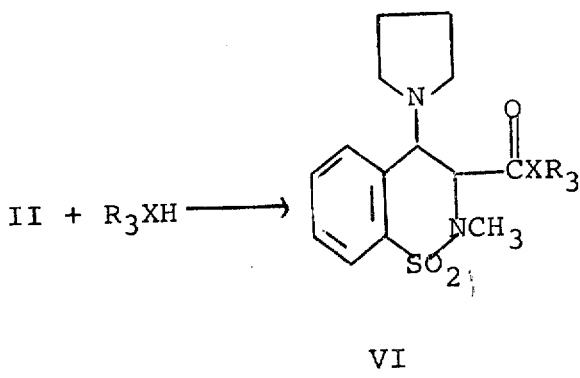

VI

Signed and sealed this 8th day of October 1974.

(SEAL)
Attest:

McCOY M. GIBSON JR.
Attesting Officer

C. MARSHALL DANN
Commissioner of Patents